April 22, 1969 P. VAN DER LELY 3,439,920

TONE ARM TO CARTRIDGE CONNECTION FOR PHONOGRAPHS

Filed March 7, 1967

INVENTOR.
PIET VAN DER LELY

BY
Frank R. Jeffrey
AGENT

United States Patent Office 3,439,920

Patented Apr. 22, 1969

3,439,920

TONE ARM TO CARTRIDGE CONNECTION FOR PHONOGRAPHS

Piet van der Lely, Emmasingel, Eindhoven, Netherlands, assignors, by mesne assignments, to U. S. Philips Corporation, New York, N.Y., a corporation of Delaware Filed Mar. 7, 1967, Ser. No. 621,251
Claims priority, application Netherlands, Apr. 15, 1966, 6605034
Int. Cl. G11b *3/02*
U.S. Cl. 274—24 4 Claims

ABSTRACT OF THE DISCLOSURE

This invention relates to an arrangement for securing a cartridge element within a cavity positioned at one end of the tone arm of a record player. Within the cavity a series of spring loaded clamps provides a clamping and a conductive engagement between the cartridge and the tone arm. A latching projection on the cartridge engages the tone arm to provide positive locking engagement with the tone arm.

It is known to secure a cartridge within a cavity contained in the tone arm of a phonograph by means of a spring clip in the form of a hair pin engaging the cartridge element and secured within the cavity of the tone arm. When the cartridge element is inserted in the cavity a vertically extending grooved projection on the cartridge element passes between and thereby spreads the arms of the spring clip. The arms of the spring clip lockingly engage the cartridge element by sliding into the groove on the projection. The projection when engaged by the spring clip extends through an opening in the wall of the tone arm. To release the cartridge element, a pressure is exerted on the exposed end of the projection thereby causing the spring clip arms to spread apart and release the cartridge element. Electrical contact between the cartridge element and the tone arm is accomplished by a cantilevered contact extending from the cartridge which biasingly engages a terminal on the tone arm.

An object of this invention is to provide connection between a cartridge element and tone arm which requires a minimum of components.

A further object of this invention is to provide a connection which clampingly engages and at the same time provides electrical contact between the cartridge element and the tone arm.

In accordance with the invention, a cartridge element is mounted in a tone arm by means of a latching projection attached to the cartridge element housing and a series of resilient clamping means which both hold the cartridge element within the tone arm and provide electrical contact between terminals on the cartridge element and conductor leads arranged within the tone arm.

In the construction according to the invention there is provided a cavity within the free end of the tone arm; the entrance to which is on the lower side of the tone arm. When the cartridge element is inserted into the cavity from the lower side of the tone arm, the cartridge and the arm are automatically locked with respect to one another by the interlocking of the latching projection on the cartridge case with an opening in one wall of the tone arm and the coordinate clamping action of the resilient spring clip. To remove the cartridge element from the tone arm cavity, a manually applied force is exerted on the latching projection which counters the biasing force applied by the spring clip and thereby causes the release of the interlocking connection.

The invention will be described in greater detail with reference to a preferred embodiment thereof illustrated in the accompanying drawing, in which.

Figure 1:
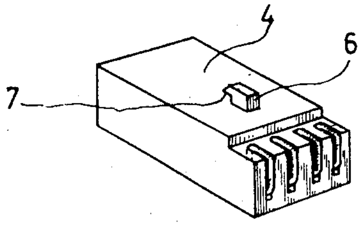
FIGURE 1 is a perspective view of a cartridge element in accordance with the invention.
Figure 2:
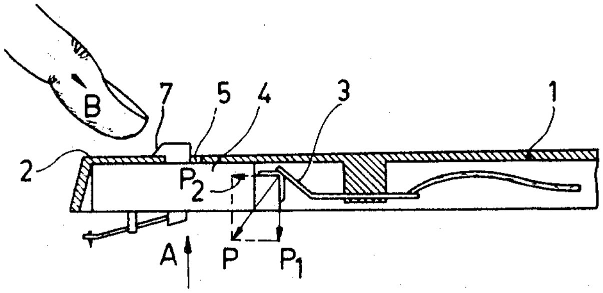
FIGURE 2 is a sectional view of the end of a tone arm in which the cartridge element, in accordance with the invention, is mounted.

In the drawing, a tone arm 1 has a cavity therein at 2 open on its lower side in which is provided electric contacts 3 for cartridge element 4. The cartridge element 4 is an electromechanical transducer which transforms the record groove configuration into an electric signal for the record player. The contacts 3 are in the form of leaf springs. These contacts 3 also constitute the means for clamping the element 4 into the arm 1. The end sections of the leaf springs 3 which engage the cartridge element are arranged at an acute angle to the longitudinal axis of the arm so that the resulting force P exerted on the cartridge element 4 by the springs has a transverse force component $P_1$, directed to the open lower side of the arm, and a longitudinal force component $P_2$, extending substantially in the longitudinal direction of the arm. The upper wall of the tone arm cavity has an aperture 5 the object of which will appear below.

The cartridge element 4, which in this embodiment is box-shaped, is provided on its upper side with a projection 6, the end of which is shaped to provide a latching hook 7. The dimensions of the latching hook 7 and of the aperture 5 in the wall of the tone arm cavity are chosen so that the latching hook 7 will pass through the aperture 5 upon the insertion of the cartridge element (in the direction of the arrow A) into the end cavity in the tone arm. The cartridge element 4 is displaced in the longitudinal direction with respect to the tone arm 1 under the influence of the force $P_2$ such that the cartridge element 4 and the tone arm 1 are automatically interlocked by means of the latching hook 7 engaging the tone arm wall surrounding the aperture 5. The force component $P_1$ maintains electrical contact between the contacts 3 and the terminals on the cartridge element. In order to remove the element from the tone arm, the latching hook 7 is manually pressed in the direction of the arrow B and thereby disengages the cartridge element 4 from the tone arm. The cartridge element 4 is then forced out of the tone arm by the force $P_1$ which is applied by the contact 3.

It should be noted that the shape of the aperture 5 and of the latching hook 7 cooperating therewith as shown in the figures is not essential to the invention. The aperture 5 may, for example, be round or square or may have the shape of a keyhole provided that the dimensions of the locking member are adapted thereto so that the cartridge element and the tone arm can be interlocked by a relative displacement under the influence of the spring force $P_2$. The invention also relates to the constructions in which the aperture 5 is provided in one side wall or in both side walls of the arm end 2 and the latching projection is located on one side face or on both opposite side faces of the cartridge element. In order to adapt the cartridge element for mounting and releasing from such constructions, the aperture in the side wall or side walls of the arm must have on the lower side of the tone arm an open end for receiving the projection or projections of the cartridge.

The above cited embodiment is intended as exemplary only, and while I have described my invention with a specific application and embodiment thereof, other modifications will be apparent to those skilled in the art without departing from the spirit and scope of the invention.

What is claimed is:

1. A tone arm assembly for a record player comprising a substantially longitudinal tone arm structure having an end portion provided with a cavity adapted to receive a cartridge element, latching means on said cartridge element, said cartridge element having terminal portions at one end thereof, an entrance in said end portion for providing access to said cavity, an aperture in said end portion adapted to receive said latching means, and at least one resilient electrical contact means extending from one wall defining said cavity, said resilient contact means providing a biasing means adapted to apply a first force to said cartridge element in the longitudinal direction of said tone arm to lockingly engage said latching means with said aperture and a second force to said cartridge element to provide an electrically conductive path between said resilient contact means and said terminals.

2. A tone arm assembly according to claim 1 wherein said resilient contact means comprises a leaf spring having a substantially elongated portion parallel to the longitudinal axis of said tone arm and having an end portion integral with and at an acute angle to said elongated portion with said acute portion adapted to engage said cartridge element in electrically conductive relationship.

3. A tone arm and cartridge element connection for a record player comprising a substantially longitudinal tone arm structure having an end portion provided with a cavity, an entrance in said end portion for providing access to said cavity, an aperture in said end portion, at least one electrically conductive resilient contact means extending from one wall defining said cavity in said end portion, said resilient contact means providing a biasing means for applying a first force in the longitudinal direction of said tone arm and a second force in the direction normal thereto; a cartridge element means positioned in said cavity, said cartridge element means including a series of electrical terminals and a hooked latching projection, said latching projection passing through said aperture in said tone arm, said resilient contact means engaging said electrical terminals on said cartridge element with said first force providing interlocking engagement between said hooked latching projection and the wall defining said aperture and said second force maintaining electrical contact between said resilient contact means and said cartridge element terminals.

4. A tone arm and cartridge element connection according to claim 3 wherein the resilient contact means comprises a leaf spring, in which said biasing means comprises a substantially elongated resilient portion of said leaf spring parallel to the longitudinal axis of said tone arm, and an end portion of said leaf spring integral with and at an acute angle to said elongated portion, said acute end portion being in electrically conductive and biased relationship to said terminals on said cartridge element.

References Cited

FOREIGN PATENTS 531,740 1/1941 Great Britain.

ROBERT B. HULL, *Primary Examiner.*

F. J. D'AMBROSIO, *Assistant Examiner.*